(12) United States Patent
Smith

(10) Patent No.: US 7,520,302 B2
(45) Date of Patent: Apr. 21, 2009

(54) ELECTRICAL STRETCH HOSE

(76) Inventor: Stacy Smith, 528 Kingsmoor Dr., Simpsonville, SC (US) 29681

(*) Notice: Subject to any disclaimer, the term of this patent is extended or adjusted under 35 U.S.C. 154(b) by 0 days.

(21) Appl. No.: 11/529,629

(22) Filed: Sep. 28, 2006

(65) Prior Publication Data

US 2009/0050227 A1    Feb. 26, 2009

(51) Int. Cl.
*F16L 11/118*    (2006.01)

(52) U.S. Cl. .............. 138/118; 138/119; 138/133; 138/134; 138/122; 138/129; 15/315; 174/47

(58) Field of Classification Search ............ 138/118, 138/119, 133, 134, 114, 129, 122, 137, 140, 138/141, DIG. 1; 174/47, 113 R, 114 R; 15/314, 315, 377, 414; 428/36.91
See application file for complete search history.

(56) References Cited

U.S. PATENT DOCUMENTS

| | | | | | |
|---|---|---|---|---|---|
| 2,322,925 | A | * | 6/1943 | Dickey | 534/787 |
| 2,337,374 | A | * | 12/1943 | Chernack | 138/134 |
| 2,396,059 | A | * | 3/1946 | Roberts | 138/122 |
| 2,605,099 | A | * | 7/1952 | Brown | 267/33 |
| 2,890,264 | A | * | 6/1959 | Duff | 174/47 |
| 2,914,790 | A | * | 12/1959 | Warburton | 15/327.1 |
| 2,961,007 | A | * | 11/1960 | Martin | 138/122 |
| 2,963,750 | A | * | 12/1960 | Pavlic | 156/144 |
| 2,998,474 | A | * | 8/1961 | Pavlic | 174/47 |
| 3,080,891 | A | * | 3/1963 | Duff | 138/122 |
| 3,155,559 | A | * | 11/1964 | Hall | 156/195 |
| 3,861,424 | A | * | 1/1975 | Mizutani et al. | 138/119 |
| 4,140,154 | A | * | 2/1979 | Kanao | 138/132 |
| 4,213,811 | A | * | 7/1980 | Hall et al. | 156/195 |
| 5,555,915 | A | * | 9/1996 | Kanao | 138/133 |
| 6,024,132 | A | * | 2/2000 | Fujimoto | 138/122 |
| 6,103,971 | A | * | 8/2000 | Sato et al. | 174/47 |
| 6,948,527 | B2 | * | 9/2005 | Ragner et al. | 138/119 |

FOREIGN PATENT DOCUMENTS

| | | | |
|---|---|---|---|
| GB | 2322925 A | * | 9/1998 |
| JP | 2003290097 A | * | 10/2003 |

* cited by examiner

*Primary Examiner*—Patrick F Brinson
(74) *Attorney, Agent, or Firm*—Thomas A. O'Rourke; Booner & O'Rourke, LLP

(57) ABSTRACT

The present invention is an electrical extensible hose that includes an outer shell, an inner core and at least one helical wire, which acts like a skeleton. In the present invention one implemented an additional wire that was conductive. The outer shell and inner core of the present invention may be bonded together via heat fusion. The helical wire is attached to the inner core via heat fusion. The helical wire supports the outer shell and inner core so as to form a tube. The outer shell and the inner core have a portion that forms an angular fold and have a portion that remains fixed. The second wire is attached at a point below the fixed portion of the electrical stretch hose so as to allow for maximum constriction caused by the shrinkable force created by the helical wire, thus increasing the stretch ratio of the hose.

24 Claims, 3 Drawing Sheets

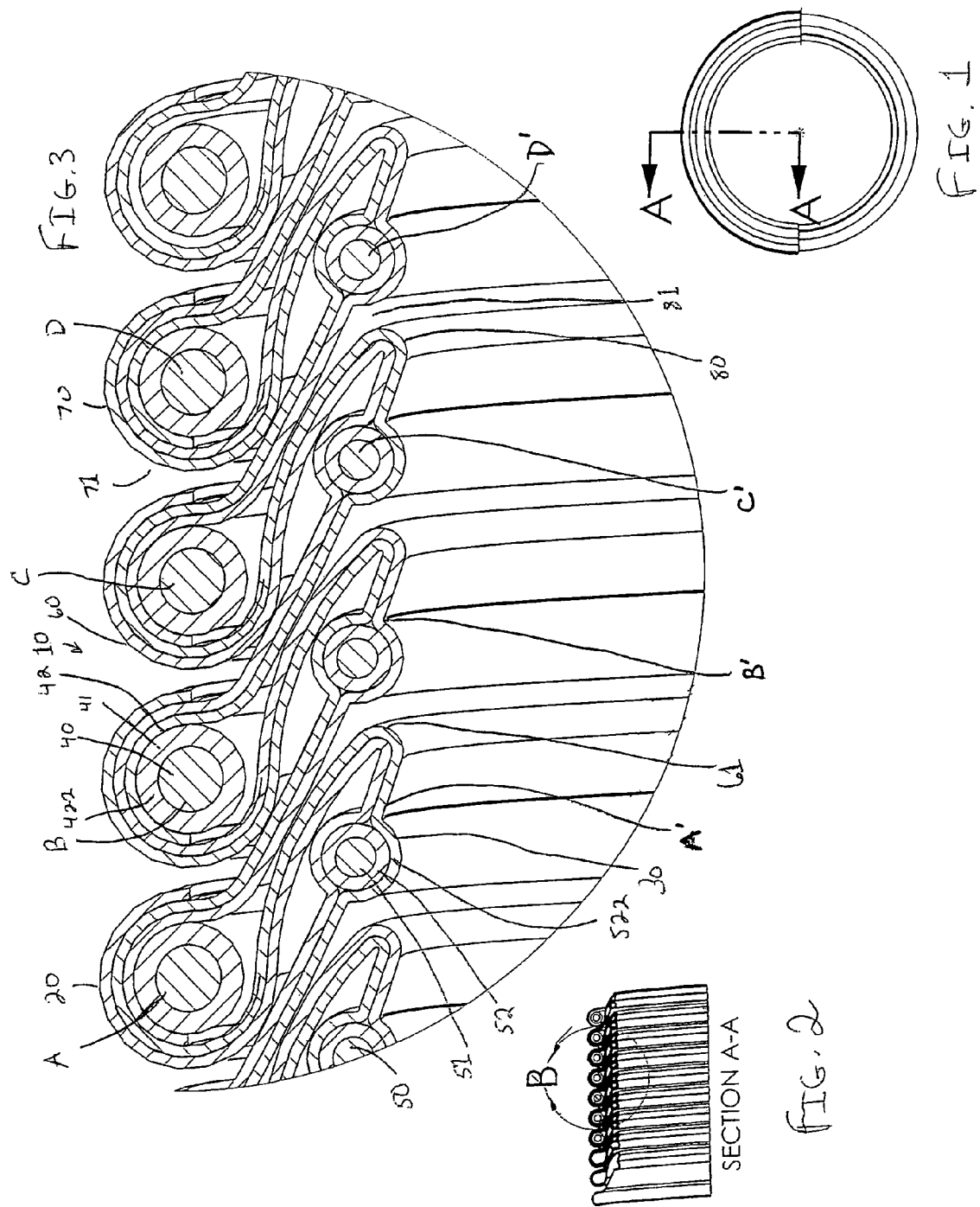

ELECTRICAL STRETCH HOSE

FIELD OF INVENTION

The present invention relates to stretch hoses, in particular stretch hoses that are wire reinforced with at least one current carrying wire, which is useful for a vacuum cleaner, vacuuming systems and the like.

BACKGROUND OF THE INVENTION

A hose is a hollow tube designed to carry fluids from one location to another. Hoses are generally cylindrical in shape having a generally circular cross section. Hoses are used in a variety of different applications. Specific applications include:
  A garden hose is used to water plants in a garden or lawn, or to convey water to a sprinkler for the same purpose.
  A fire hose is used by firefighters to convey water to the site of a fire.
  Air hoses are used in underwater diving (e.g. scuba diving) to carry air from the surface or to from air tanks.
  Vacuum cleaner hoses used for transporting the dirt from the vacuum cleaner head to the vacuum cleaner containment unit.

In addition to the vast applications hoses can be used for, they come in a variety of different designs, for example some hoses are flexible, i.e. they stretch, as in the present invention, and others are not. The remainder of the specification, of the present patent application, will discuss the former type of hose, with specific reference made to current carrying flexible hoses. Stretch hoses, are generally wire reinforced, and fall into two broad categories, vacuum only and electrical. The majority of stretch hoses are vacuum only.

Exhaust systems, air ventilation systems, lint collection systems, oil mist collector systems, HVAC, and of course vacuum cleaners, are just a few of the systems that may implement a current carrying flexible hose. Current carrying hoses may be used with both low and high voltages. In addition, current carrying vacuum cleaner hoses may be integrated with a vast number of different fittings, depending on the desired use. For example, one may attach a brush for cleaning upholstery, or one may attach a wand for reaching those hard to reach places.

Flexible hoses are generally reinforced with a wire helix, this allows the hose to expand and contract when needed, some types of extensible hoses may extend up to four times their compressed length. In addition, the reinforced wire helix gives additional strength to the flexible hose. Flexible hoses are constructed of many different materials, depending on their intended use, such as thermoplastic polyurethane, thermoplastic rubber, and the like. Some flexible hoses are clear, and some are colored, depending on their intended use. Most flexible hoses are lightweight, economical, and have excellent flexibility. In addition, flexible hoses are designed to operate in a variety of different environments and temperature ranges, for example some flexible hoses are designed to operate inside and/or outside and under conditions where the temperature can range from −65F to 200F.

A flexible current carrying hose can be seen in U.S. Pat. No. 2,890,264, disclosures of which are hereinafter incorporated by reference, invented by Jack E. Duff, assigned to The Hoover Co. That prior art embodied a means for conducting electricity along the length of a hose so that a suction cleaner may be controlled from one end of the hose or to provide electric current at the end of the hose for operating an electrically actuated device at the hose end. However useful this invention was, there were shortcomings, for example it was difficult to assemble an electrical conductor in the hose wall without impairing the extensibility of the hose.

Other prior art such as U.S. Pat. No. 2,998,474, disclosures of which are hereinafter incorporated by reference, invented by Mary C. Pavlic, also assigned to the Hoover Company, improved on the shortcomings of the Duff invention, however there still existed the problem of great pressure loss and high suction resistance.

A more recent flexible extensible hose is U.S. Pat. No. 6,024,132, disclosures of which are hereinafter incorporated by reference, invented by Noriaki Fujimoto, assigned to Tiger Polymer Corporation, Osaka, Japan, implemented a bellows hose wall with a spiral reinforcing wire and a covered conductor wire. In Fujimoto the reinforcing wire and conducting wire are adjacent to each other, thus limiting the amount of restriction of the hose in a contracted position.

Yet another example of prior art may be seen in United Kingdom Patent 2,322,925, disclosures of which are herein incorporated by reference, assigned to Smiths Industries Public Ltd. Co. In this current carting vacuum cleaner hose the hose assembly also consists of a reinforcing wire 4 and a current carrying wire 5. In this prior art reinforcing wire 4 may also be used as a current carrying wire if desired. However, this prior art also has some disadvantages, for example the current carrying vacuum cleaner hose has limited extensibility, because of the wire configuration, as seen in FIG. 2 in that application.

OBJECTS OF INVENTION

It is therefore an object of the present invention to produce a low cost, easy to manufacture an improved flexible current carrying hose.

It is an object of the present invention to provide an improved extensible flexible hose.

It is an object of the present invention to produce an improved flexible extensible current carrying hose having at least one conducting wire.

It is also an object of the present invention to produce a flexible extensible current carrying hose that has a greater stretch ratio than conventional stretch hoses.

It is an object of the present invention to provide a hose that has a higher stretch ratio in the order of 8 to 1 than conventional current carrying stretch hoses.

These and other objects of the present invention will become apparent to those skilled in the art from a review from the description provided below.

SUMMARY OF INVENTION

The present invention includes a thermoplastic outer shell that is bonded to an inner core. The outer shell is a flexible thermoplastic film that is sealed to the inner core. The inner core is also a thermoplastic flexible sheet.

The reinforcing wire is generally a helical wire that is sandwiched between the core and the outer shell. Also between the core and the shell there may be at least one current carrying wire. The reinforcing wire may be an electrical conducting wire if desired. The present invention also includes a reinforcing wire that may or may not be a conducting wire, and at least one current carrying wire. The main disadvantage of the prior art electrical conducting hose is that if additional wires are present in the hose, particularly current carrying wires, the stretch ratio would be greatly reduced due to the added volume in the helix, thus limiting how tight the hose could be contracted. The present invention, remedies this disadvantage. The present invention takes optimal advantage of the angular fold of the flexible hose where one side of the fold is essentially fixed and most of the deflection and displacement associated with extending the hose occurs on the other side. Thus, by placing one or more additional wires on the bottom of the fixed side of the fold, where large displacements of the flexible cover are not experienced, they can pass under the outer helix, which allows a much tighter contraction of the helix and therefore a greater stretch ratio.

An additional benefit to lowering the additional wires in the hose geometry is a smaller helical diameter for the current carrying wires, thereby reducing materials, weight and cost compared to putting all wires at the same diameter as the helical reinforcement, as in the prior art.

BRIEF DESCRIPTION OF INVENTION

FIG. 1 is an end view of the electrical stretch hose of the present invention in the A-A plane.

FIG. 2 is cross-sectional view of the electrical stretch hose of the present invention in the A-A plane.

FIG. 3 is a cross-sectional view of the electrical stretch hose of the present invention in the A-A plane magnified 10×.

DETAILED DESCRIPTION OF THE INVENTION

Figure 4:
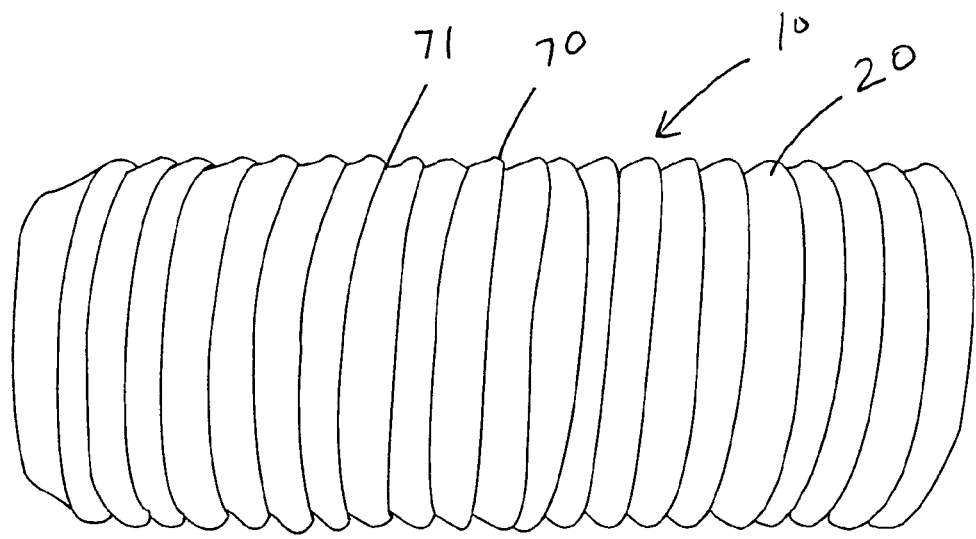
FIG. 4 is a perspective view of the electrical stretch hose of the present invention, with two conducting wires, in a retracted position.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

There are many methods for continuously forming a reinforced flexible hose, one such method may be seen in U.S. Pat. No. 4,213,811, invented by Marcus Hall, the disclosures of which are herein incorporated by reference. Another method may be seen in U.S. Pat. No. 3,155,559, also invented by Marcus Hall, the disclosures of which are incorporated by reference. One may implement any of the aforementioned methods of forming stretch hoses, or other methods not yet known at this time, the crux of the present invention is not the method of forming the stretch hose, but the unique placement of the reinforcing wire and the current carrying wire.

As seen in FIGS. 3-7, is the electrical stretch hose 10 of the present invention. Electrical stretch hose 10 includes an outer shell material 20, an inner core material 30, a reinforcing helical wire 40, and a current carrying wire 50. In other embodiments one may add additional current carrying wires as needed.

Figure 5:
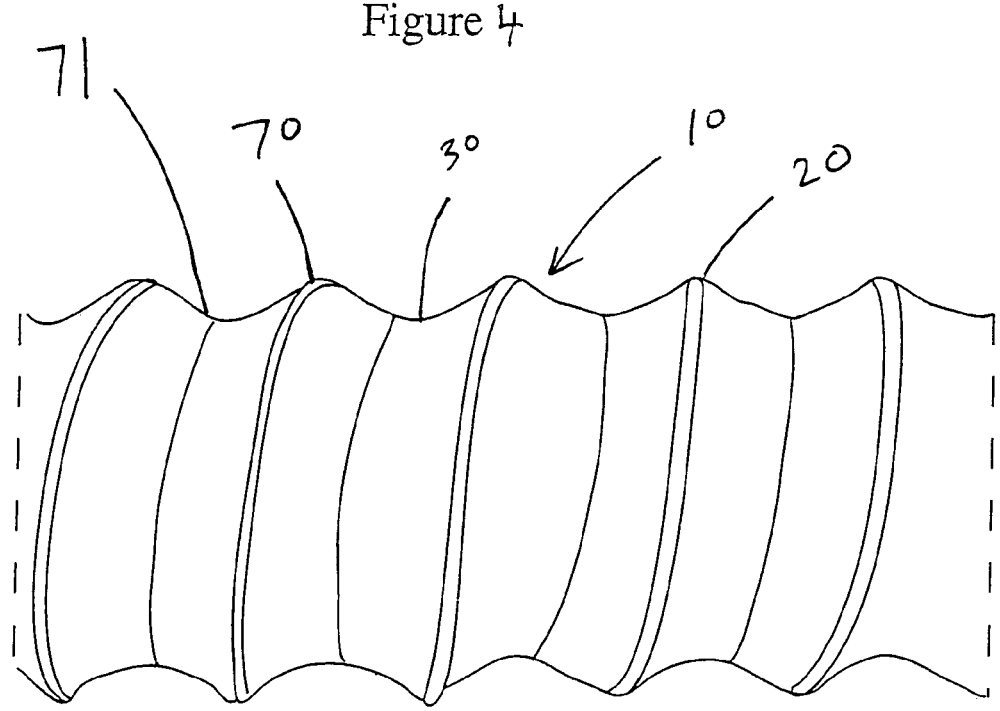
FIG. 5 is a perspective view of the electrical stretch hose of the present invention, with two conducting wires, in an extended position.
Figure 6:
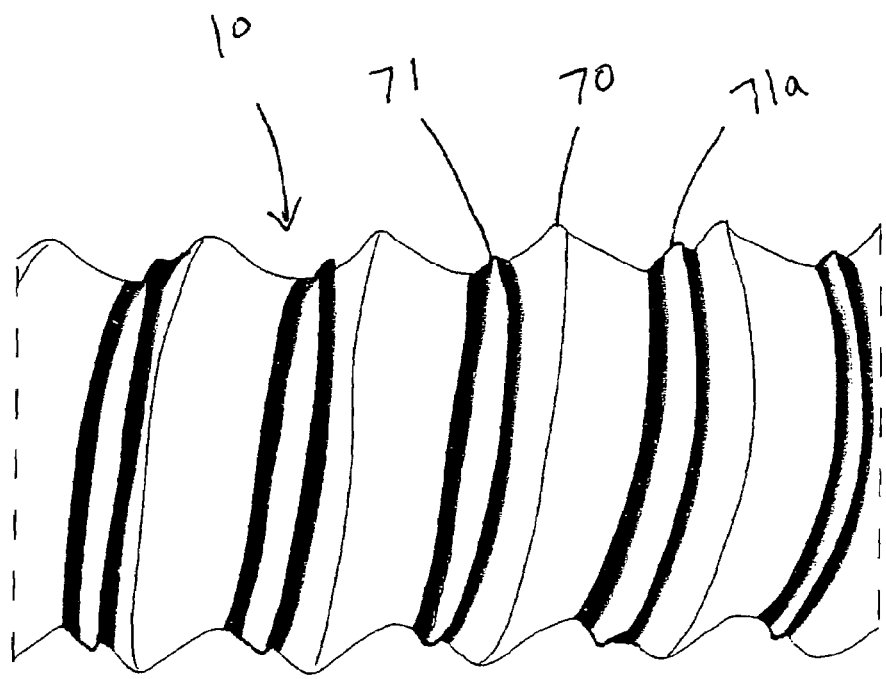
FIG. 6 is a perspective view of the electrical stretch hose of the present invention, with one conducting wire, in an extended position.

Directing one's attention to the drawing marked FIG. 3, one can see a cross-sectional view of electrical stretch hose 10. Electrical stretch hose 10 may be generally cylindrical in shape, as seen in FIGS. 4-7, however, one may implement any suitable shape known in the art including, but not limited to a square, rectangle, and the like. Electrical stretch hose 10 may have an outer shell material 20, as seen in FIGS. 5 and 6. Electrical stretch hose 10 may have two open ends, which may be used for attaching electrical hose 10 to the desired device being used, also see in FIGS. 5 and 6. Outer shell 20 may be manufactured from a variety of different materials, such as resins, PVC, soft plastics and the like. In the preferred embodiment one implemented a thermoplastic material for outer shell 20. One may implement any suitable color known in the art including, but not limited to black, red, or the like. Conversely, one may implement a transparent outer shell, if desired. In the preferred embodiment one implemented a black thermoplastic.

Again directing one's attention to FIG. 3, electrical stretch hose 10 also includes inner core material 30. Inner core 30 may be manufactured from any suitable known material in the art including, but not limited to resins, PVC's, soft plastics and the like. In the preferred embodiment one implemented the same type of thermoplastic material used for outer shell 30. Inner core 30 and outer shell 20 may be bonded or fused together by any suitable known means in the art including, but not limited to heat fusion, adhesives and the like. In the preferred embodiment one bonded outer shell 20 to inner core 30 via heat fusion.

Furthermore, one may use multiple layers of thermoplastic material for outer shell 20 and inner core 30. For example, one may have a stretch hose with two layers of thermoplastic material bonded together, for outer shell 20, and three layers of thermoplastic material bonded together, for inner core 30. The need for more then one layer of material, for either outer shell 20 or inner core 30, will depend on the desired use of the stretch hose.

Electrical stretch hose 10 may also include a helical reinforcing wire 40. Helical wire 40 is the skeleton of electrical stretch hose 10. Helical wire 40 may be manufactured from any suitable known material in the art, including, but not limited to metal, metal alloy, hard plastic, and the like. In the preferred embodiment one implemented an insulated copper wire. Insulation 41 may have an inner diameter so as to be able to cover helical wire 40, as seen in FIG. 3. Insulation 41 may have outer circumferential surface 42 and inner circumferential surface 42a. This type of wire was preferred because one desired helical wire 40 to be a current carrying wire. One could however, implement a helical wire made out of plastic, PVC, or any other non-conductive material. One key attribute of helical wire 40 is that it must be able to expand and contract, like a helical spring. Another key attribute of helical wire 40 is that it must be able to support outer shell 20 and inner core 30. Helical wire 40 may be attached to inner core material 30 by any known suitable means in the art including but not limited to heat fusion or welding and adhesion with adhesives. In the preferred embodiment one attached outer surface 42 of insulation 41 of insulated helical wire 40 to inner core material 30 via heat fusion, as seen in FIG. 3. In another type of embodiment one could have sandwiched helical wire 40 between inner core material 30 and outer shell material 20. In yet another embodiment one may implement more then one helical wire, for example one may implement a stretch hose with two helical wires.

Figure 7:
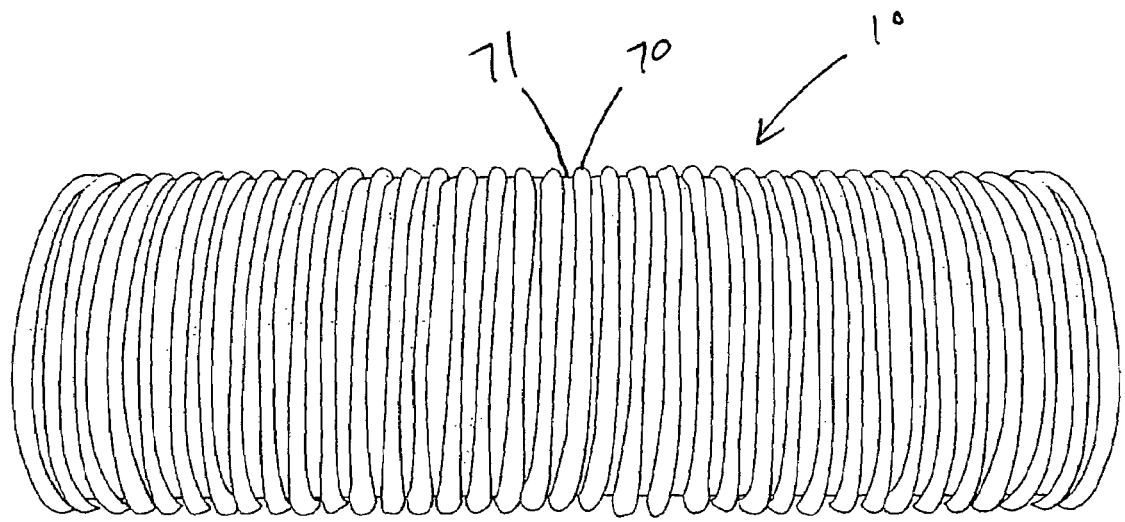
FIG. 7 is a perspective view of the electrical stretch hose of the present invention, with one conducting wire, in a retracted position.

As mentioned above one may have one helical current carrying wire, or one may have many current carrying wires. In the preferred embodiment one implemented a single current carrying wire, as seen in FIGS. 6 and 7. An embodiment with more than one current carrying wire may be seen in FIGS. 4 and 5. In this embodiment one implemented two current carrying wires. Other then the number of current carrying wires used the two embodiments of the present invention operate identically.

As just mentioned, in addition to having helical wire 40 one may implement a second wire 50. Second wire 50 may be conductive or non-conductive, depending on the desired application. In the preferred embodiment one implemented a helical current carrying second wire 50, i.e. conductive. Since helical second wire 50 will be implemented as a current carrying wire, it will be insulated, and as such has insulation 51 along with outer and inner surfaces 52 and 52a respectively, as seen in FIG. 3. Second wire 50 may be attached to electrical stretch hose 10 by any suitable method known in the art including, but not limited to the methods mentioned above. In the preferred embodiment one sandwiched second wire 50 between outer shell 20 and inner core 30. One would like to point out that one could have easily attached second wire 50 in the same manner as helical wire 40.

In normal operation when the electrical stretch hose is in a contracted position, as seen in FIGS. 3, 4 and 7, there will be a plurality of hills 70 and valleys 71, the number of hills 70 and valleys 71 will depend on the length of the electrical stretch hose desired, i.e. the longer the length the more hills and valleys that will be present. The distance between hills will vary depending on the corresponding shrinkage force of the helical wire implemented and the type of material used for the outer and inner material. Thus, a helical wire with greater shrinkage force will have less distance between adjacent hills. When electrical stretch hose 10 is in a contracted position, second wire 50 will be positioned under and to the right of helical wire 40, as seen in FIG. 3. In addition, a portion 60 of outer shell 20 and inner core 30 will form an angular fold over second wire 50, as seen in FIG. 3. Another portion 61 of outer shell 20 and inner core 30 remains fixed. The angular folding of portion 61 of electrical stretch hose 10 allows for maximum contraction, and thus increases the stretch ratio. When electrical stretch hose 10 is in a stretched position, the distance between the hills and valleys is increased as seen in FIGS. 5 and 6. In addition, located in each valley 71 there may be a ridge 71a. Ridges 71a are formed by second wire 50, as seen in FIGS. 5 and 6. Ridge 71a cause the material of the stretch hose to fold, when the stretch hose goes from an extended position to a retracted position. Located at the lowest point of each valley 71 may be base portion 71c. In addition to the hills 70 and valleys 71 located on outer shell 20, there may be hills 80 and valleys 81 located on inside core 30, as seen in FIG. 3.

Drawing one's attention to FIGS. 3-7, one will now discuss the angular fold of the present invention with one current carrying wire in more detail to give the reader a better understanding on how the present invention improves on the prior art electrical stretch hoses, keeping in mind that the angular fold with two current carrying wires is identical. For illustrative purposes helical reinforcing wires 40 are represented by A, B, C and D. A, B, C and D are all aligned along the same central axis, as depicted in FIG. 3. Also, current carrying wire 50, now represented by A', B', C' and D' are also aligned along the same central axis. FIG. 3 will be considered one array of the many arrays present in the electrical stretch hose. When the electrical stretch hose of the present invention is in a retracted position, A' will be located below and between A and B. In addition, B' will be located between B and C, and so forth. This will continue down the length of the hose, because of the symmetrical configuration of the hose, that is to say each portion on electrical carrying wire will be located below and between two corresponding reinforcing wires in different arrays. When the electrical stretch hose is in an extended position, B' will be located between A and B, C' will be located below and between B and C and so forth down the length of the hose, for the foregoing reasons. The reason for this "shift" is because of the positioning of the current carrying wire and the reinforcing wire. In another embodiment one may also have the current carrying wire "shift" across more then one portion of the helical wire. For example, in the preceding example when the stretch hose is in an extended position, C' may be located between B and C, as previously discussed, however if one desired one could have C' "shifted" to a position between A and B. The shift of the current carrying wire will depend on needed application of the stretch hose. In prior art the current carrying wire and the reinforcing wire are adjacent to each other, whereas in the present invention the current carrying wire is located in the angular fold.

The key feature of the present invention is not the attaching methods of wires 40 and 50 to electrical stretch hose 10, but rather the positioning of second wire 50 in relation to helical wire 40. In the present invention second wire 50 must be placed on the bottom of the fixed side of the fold, this is where large displacements of the flexible cover are not experienced, thus allowing second wire 50 to pass under outer helical wire 40 allowing for a much tighter contraction of the helix and therefore a greater stretch ratio.

As various changes could be made in the above constructions without departing from the scope of the invention, it is intended that all matter contained in the above description shall be interpreted as illustrative and not in a limiting sense. In the view above it will be seen that several objects of the invention are achieved and other advantageous results attained.

What is claimed is:

1. A flexible hose for carrying fluids said hose being in a retracted condition when no tensile force is placed on said hose and in an extended condition when a tensile force of a pulling nature is placed on a section of said hose, said hose comprising:

a first end;

a second end;

a thermoplastic cover comprising at least one layer of thermoplastic material wherein said thermoplastic cover further comprises an interior surface and an exterior surface;

at least one helical member, capable of retaining its shape in said hose adhered to said interior surface of said thermoplastic cover, said helical member being capable of extending when a tensile force of a pulling nature is applied and then retracting to generally the original shape when said force is not applied, said helical member forming a plurality of peaks in said thermoplastic cover;

a helical conductor wire capable of carrying a current of electricity said conductive wire being disposed on said thermoplastic cover in a valley between the peaks formed by the said helical member; and wherein when said hose is in a retracted condition there is an angular fold between adjacent peaks formed by said thermoplastic cover with said helical member and wherein there is at least a first peak adjacent to a second peak and, each of said peaks being formed by said helical member and wherein at least a respective portion of the conducting wire is positioned between the first and second peak when said hose is in an expanded position and is positioned under and between a second pair of peaks, where said peaks are not the first and the second peak, when said hose is in a retracted position.

2. The flexible hose according to claim 1 wherein said helical member is comprised of a material capable of carrying a current of electricity.

3. The flexible hose according to claim 2 wherein said valley has a base and said helical conducting wire is positioned on the inside surface of said thermoplastic cover and is between said helical member and said base of said valley.

4. The flexible hose according to claim 3 wherein there is a second helical conducting wire.

5. The flexible hose according to claim 4 wherein said second helical conducting wire is on the same valley wall as said first helical conducting wire.

6. The flexible hose according to claim 5 wherein said second helical conducting wire is adjacent to said first helical conducting wire.

7. A flexible hose for carrying fluids said hose being in a retracted condition when no tensile force is placed on said hose and in an extended condition when a tensile force of a pulling nature is placed on a section of said hose, said hose comprising:
- a first end;
- a second end;
- a thermoplastic cover comprising at least one layer of thermoplastic material wherein said thermoplastic cover further comprises an interior surface and an exterior surface;
- at least one helical member, capable of retaining its shape in said hose adhered to said interior surface of said thermoplastic cover, said helical member being capable of extending when a tensile force of a pulling nature is applied and then retracting to generally the original shape when said force is not applied, said helical member forming a plurality of peaks in said thermoplastic cover;
- a helical conductor wire capable of carrying a current of electricity said conductive wire being disposed on said thermoplastic cover in a valley between the peaks formed by the said helical member; and
- wherein when said hose is in a retracted condition there is an angular fold between adjacent peaks formed by said thermoplastic cover with said helical member and wherein there is at least a first peak adjacent to a second peak and a third peak which is adjacent to said second peak, each of said peaks being formed by said helical member and wherein at least a respective portion of the conducting wire is positioned between the first and second peak when said hose is in an expanded position and is positioned between said second peak and said third peak when said hose is in a retracted position.

8. The flexible hose according to claim 7 wherein said helical member is comprised of a material capable of carrying a current of electricity.

9. The flexible hose according to claim 8 wherein said valley has a base and said helical conducting wire is positioned on the inside surface of said thermoplastic cover and is between said helical member and base of said valley.

10. The flexible hose according to claim 9 wherein there is a second helical conducting wire.

11. The flexible hose according to claim 10 wherein said second helical conducting wire is on the same valley wall as said first helical conducting wire.

12. The flexible hose according to claim 11 wherein said second helical conducting wire is adjacent to said first helical conducting wire.

13. A flexible hose for carrying fluids said hose being in a retracted condition when no tensile force is placed on said hose and in an extended condition when a tensile force of a pulling nature is placed on a section of said hose, said hose comprising:
- a first end;
- a second end;
- a thermoplastic cover comprising at least one layer of thermoplastic material wherein said thermoplastic cover further comprises an interior surface and an exterior surface;
- at least one helical member, capable of retaining its shape in said hose adhered to said interior surface of said thermoplastic cover, said helical member being capable of extending when a tensile force of a pulling nature is applied and then retracting to generally the original shape when said force is not applied, said helical member forming a plurality of peaks in said thermoplastic cover;
- a helical conductor wire capable of carrying a current of electricity said conductive wire being disposed on said thermoplastic cover in a valley between the peaks formed by the said helical member; and
- wherein when said hose is in a retracted condition there is an angular fold between adjacent peaks formed by said thermoplastic cover with said helical member and wherein there are a plurality of peaks including at least a first peak adjacent to a second peak and, each of said peaks being formed by said helical member and wherein at least a respective portion of the conducting wire is positioned between the first and second peak when said hose is in an expanded position and is positioned under and between said second peak and another peak not the first peak when said hose is in a retracted position.

14. The flexible hose according to claim 13 wherein said helical member is comprised of a material capable of carrying a current of electricity.

15. The flexible hose according to claim 14 wherein said valley has a base and said helical conducting wire is positioned on the inside surface of said thermoplastic cover and is between said helical member and base of said valley.

16. The flexible hose according to claim 15 wherein there is a second helical conducting wire.

17. The flexible hose according to claim 16 wherein said second helical conducting wire is on the same valley wall as said first helical conducting wire.

18. The flexible hose according to claim 17 wherein said second helical conducting wire is adjacent to said first helical conducting wire.

19. A flexible hose for carrying fluids said hose being in a retracted condition when no tensile force is placed on said hose and in an extended condition when a tensile force of a pulling nature is placed on a section of said hose, said hose comprising:
- a first end;
- a second end;
- a thermoplastic cover comprising at least one layer of thermoplastic material wherein said thermoplastic cover further comprises an interior surface and an exterior surface;
- at least one helical member, capable of retaining its shape in said hose adhered to said interior surface of said thermoplastic cover, said helical member being capable of extending when a tensile force of a pulling nature is applied and then retracting to generally the original shape when said force is not applied, said helical member forming a plurality of peaks in said thermoplastic cover;

a helical conductor wire capable of carrying a current of electricity said conductive wire being disposed on said thermoplastic cover in a valley between the peaks formed by the said helical member; and wherein when said hose is in a retracted condition there is a fold formed by said thermoplastic cover with said helical member and wherein the interior surface of said hose when in a retracted position has a plurality of peaks formed by said fold and wherein said helical member forms a plurality of peaks on the outer surface of said hose and wherein there is a first peak on the interior surface of said hose between and underneath two peaks on the outer surface of said hose when said hose is in an expanded condition and said peak on the interior surface of said hose is between a different pair of peaks when said hose is in a retracted position.

20. The flexible hose according to claim 19 wherein said helical member is comprised of a material capable of carrying a current of electricity.

21. The flexible hose according to claim 20 wherein said valley has a base and said helical conducting wire is positioned on the inside surface of said thermoplastic cover and is between said helical member and base of said valley.

22. The flexible hose according to claim 21 wherein there is a second helical conducting wire.

23. The flexible hose according to claim 22 wherein said second helical conducting wire is on the same valley wall as said first helical conducting wire.

24. The flexible hose according to claim 23 wherein said second helical conducting wire is adjacent to said first helical conducting wire.

* * * * *